United States Patent
Sugie

(10) Patent No.: US 11,949,363 B2
(45) Date of Patent: Apr. 2, 2024

(54) MOTOR DRIVER CIRCUIT, POSITIONING DEVICE AND HARD DISK APPARATUS USING SAME, AND MOTOR DRIVING METHOD

(71) Applicant: ROHM Co., LTD., Kyoto (JP)

(72) Inventor: Hisashi Sugie, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 0 days.

(21) Appl. No.: 18/161,944

(22) Filed: Jan. 31, 2023

(65) Prior Publication Data
US 2023/0253900 A1 Aug. 10, 2023

(30) Foreign Application Priority Data

Feb. 8, 2022 (JP) ................................. 2022-018135

(51) Int. Cl.
| | | |
|---|---|---|
| *G11B 5/55* | (2006.01) | |
| *G11B 19/20* | (2006.01) | |
| *G11B 20/10* | (2006.01) | |
| *H02P 7/025* | (2016.01) | |

(52) U.S. Cl.
CPC ............ *H02P 7/025* (2016.02); *G11B 5/5569* (2013.01); *G11B 19/20* (2013.01); *G11B 20/10037* (2013.01)

(58) Field of Classification Search
None
See application file for complete search history.

(56) References Cited

U.S. PATENT DOCUMENTS

| | | | | |
|---|---|---|---|---|
| 5,768,045 A * | 6/1998 | Patton, III | ............. | G11B 21/12 |
| 6,011,902 A * | 1/2000 | Yamamoto | ............. | G11B 19/28 |
| | | | | 318/632 |
| 6,072,289 A * | 6/2000 | Li | ........................ | H02P 6/085 |
| | | | | 318/400.19 |
| 6,433,502 B2 * | 8/2002 | Oku | ........................ | H02P 6/085 |
| | | | | 318/599 |
| 8,188,696 B2 * | 5/2012 | Shimizu | ................... | H02P 6/14 |
| | | | | 318/400.29 |
| 8,405,332 B1 * | 3/2013 | Krishnamoorthy | ....... | H02P 6/08 |
| | | | | 363/136 |
| 2004/0085871 A1 * | 5/2004 | Gontowski, Jr. | ..... | H03F 3/3071 |
| 2010/0201295 A1 * | 8/2010 | Kuwamura | ............. | H02P 6/182 |
| | | | | 318/400.04 |

(Continued)

FOREIGN PATENT DOCUMENTS

JP 2019161807 9/2019

*Primary Examiner* — Peter Vincent Agustin
(74) *Attorney, Agent, or Firm* — CHIP LAW GROUP

(57) ABSTRACT

Disclosed herein is a motor driver circuit including a first output terminal to be connected to a first end of a to-be-driven motor via a sense resistor, a second output terminal to be connected to a second end of the motor, an error detector that generates an error signal, an A/D converter that obtains a digital signal, a compensator that generates a voltage command value, a D/A converter that converts the voltage command value to an analog control signal, a pulse width modulator that generates a first pulse and a second pulse, and an output stage that generates a first driving voltage and a second driving voltage. During a first mode, the compensator uses the error signal obtained by the A/D converter at a negative edge timing of the first pulse, for the error signal at a positive edge timing of the second pulse.

19 Claims, 9 Drawing Sheets

(56) References Cited

U.S. PATENT DOCUMENTS

| 2018/0083557 A1* | 3/2018 | Kurosawa | G11B 19/2009 |
| 2023/0147064 A1* | 5/2023 | Sugie | G11B 5/5573 |
| | | | 318/135 |
| 2023/0253900 A1* | 8/2023 | Sugie | G11B 20/10037 |
| | | | 360/32 |

* cited by examiner

MOTOR DRIVER CIRCUIT, POSITIONING DEVICE AND HARD DISK APPARATUS USING SAME, AND MOTOR DRIVING METHOD

CROSS REFERENCE TO RELATED APPLICATIONS

This application claims priority benefit of Japanese Patent Application No. JP 2022-018135 filed in the Japan Patent Office on Feb. 8, 2022. Each of the above-referenced applications is hereby incorporated herein by reference in its entirety.

BACKGROUND

The present disclosure relates to a driver circuit of a motor.

A linear motor (linear actuator) for positioning a target object is used for a variety of electronic apparatuses and industrial machines. A voice coil motor is a kind of linear motor, and has a movable element the position of which is controllable according to a supplied driving current. A driving circuit of the voice coil motor performs feedback control on a current flowing through the voice coil motor, so as to make the current close to a target current for defining a target position.

One example of the related art is disclosed in Japanese Patent Laid-open No. 2019-161807.

SUMMARY

Driver circuits for motors that are driven with a constant current are classified into an analog type and a digital type. An analog-type driver circuit is difficult to design because phase compensation of an error amplifier is necessary. On the other hand, phase compensation in a digital-type driver circuit can easily be conducted if a proportional integral (PI) controller or a proportional integral derivative (PID) controller is adopted.

In a digital-type driver circuit, it is necessary to convert a current flowing through a motor, to a digital signal. FIG. 1 is an explanatory diagram of current detection.

In order to detect a current, a sense resistor Rs and a current sense amplifier AMP1 are provided. The sense resistor Rs is connected, between an A-phase output (AOUT) and a B-phase output (BOUT) of a motor driver circuit, in series with a motor M. In the sense resistor Rs, a voltage drop $V_{CS}$ that is proportional to a driving current $I_{DRV}$ occurs. The current sense amplifier AMP1 generates a current feedback signal $V_{FB}$ by amplifying the voltage drop $V_{CS}$ in the sense resistor Rs.

As a result of the study of current detection using the sense resistor Rs, the present inventor has recognized the following problems.

In a system in which pulse width modulation (PWM) driving is performed, AOUT and BOUT are separately switched (make transitions). On in-phase components of two input voltages Va and Vb of the current sense amplifier AMP1, the influence of a transition of BOUT is relatively smaller than the influence of a transition of AOUT.

That is, the alternate current (AC) common mode rejection ratio (CMRR) of the current sense amplifier AMP1 varies between a period in which a transition of AOUT occurs and a period in which a transition of BOUT occurs. Accordingly, a current detection error is generated.

The present disclosure has been made in view of these problems, and it is desirable to provide a driver circuit in which the accuracy of current detection is improved.

An aspect of the present disclosure relates to a motor driver circuit. The motor driver circuit includes a first output terminal to be connected to a first end of a to-be-driven motor via a sense resistor, a second output terminal to be connected to a second end of the motor, an error detector that generates an error signal based on an error between a reference signal and a current feedback signal which is based on a voltage drop in the sense resistor, an analog-to-digital (A/D) converter that obtains a digital signal by converting the error signal to the digital signal, a compensator that generates a voltage command value on the basis of the error signal obtained by the A/D converter, a digital-to-analog (D/A) converter that converts the voltage command value to an analog control signal, a pulse width modulator that generates a first pulse by comparing the analog control signal with a first triangular wave and generates a second pulse by comparing the analog control signal with a second triangular wave of a phase opposite to that of the first triangular wave, and an output stage that generates, at the first output terminal, a first driving voltage corresponding to the first pulse, and generates, at the second output terminal, a second driving voltage corresponding to the second pulse. During a first mode, the compensator uses the error signal obtained by the A/D converter at a negative edge timing of the first pulse, for the error signal at a positive edge timing of the second pulse.

Another aspect of the present disclosure also relates to a motor driver circuit. The motor driver circuit includes a first output terminal to be connected to a first end of a to-be-driven motor via a sense resistor, a second output terminal to be connected to a second end of the motor, a current sense amplifier that generates a current feedback signal based on a voltage drop in the sense resistor, a feedback controller that generates a voltage command value so as to make the current feedback signal close to a reference signal, a pulse width modulator that generates a first pulse and a second pulse having complementary duty cycles according to the voltage command value in such a way that a center of a high section of the first pulse matches with a center of a high section of the second pulse, and an output stage that generates, at the first output terminal, a first driving voltage corresponding to the first pulse, and generates, at the second output terminal, a second driving voltage corresponding to the second pulse. The feedback controller includes an A/D converter that obtains a digital signal by converting an analog signal corresponding to the current feedback signal to the digital signal, and a digital circuit that generates the voltage command value by processing the digital signal. During a first mode, the digital circuit uses the digital signal obtained by the A/D converter at a negative edge timing of the first pulse, for the digital signal at a positive edge timing of the second pulse.

A still another aspect of the present disclosure is a method for driving a motor. The method includes connecting a sense resistor in series with a first end of the motor, generating a current feedback signal on the basis of a voltage drop in the sense resistor, generating an error signal based on an error between the current feedback signal and a reference signal, obtaining, by an A/D converter, a digital signal by converting the error signal to the digital signal, generating a voltage command value corresponding to the digital signal, converting the voltage command value to an analog control signal, generating a first pulse by comparing the analog control signal with a first triangular wave, and generating a second pulse by comparing the analog control signal with a second triangular wave of a phase opposite to that of the first triangular wave, and applying a first driving voltage corresponding to the first pulse and a second driving voltage corresponding to the second pulse to the motor. During a first mode, in the generating the voltage command value, the digital signal obtained by the A/D converter at a negative edge timing of the first pulse is used for the digital signal at a positive edge timing of the second pulse.

A yet another aspect of the present disclosure also relates to a method for driving a motor. The method includes connecting a sense resistor in series with a first end of the motor, generating a current feedback signal on the basis of a voltage drop in the sense resistor, generating a voltage command value so as to make the current feedback signal close to a reference signal, generating a first pulse and a second pulse having complementary duty cycles according to the voltage command value in such a way that a center of a high section of the first pulse matches with a center of a high section of the second pulse, and applying a first driving voltage corresponding to the first pulse and a second driving voltage corresponding to the second pulse to the motor. The generating the voltage command value includes obtaining, by an A/D converter, a digital signal by converting an analog signal corresponding to the current feedback signal to the digital signal, and generating the voltage command value by processing the digital signal. During a first mode, in the generating the voltage command value, the digital signal obtained by the A/D converter at a negative edge timing of the first pulse is used for the digital signal at a positive edge timing of the second pulse.

It is to be noted that any combination of the above constituent components as well as constituent components or expressions obtained by exchanging the constituent components or the expressions among methods, devices, and systems are also effective as the present technology or an aspect of the present disclosure. Moreover, since this summary of the technology does not describe all the necessary features of the present technology, a sub-combination of the features described above can also be regarded as the present technology.

According to an aspect of the present disclosure, the accuracy of current detection can be improved.

Figure 1:
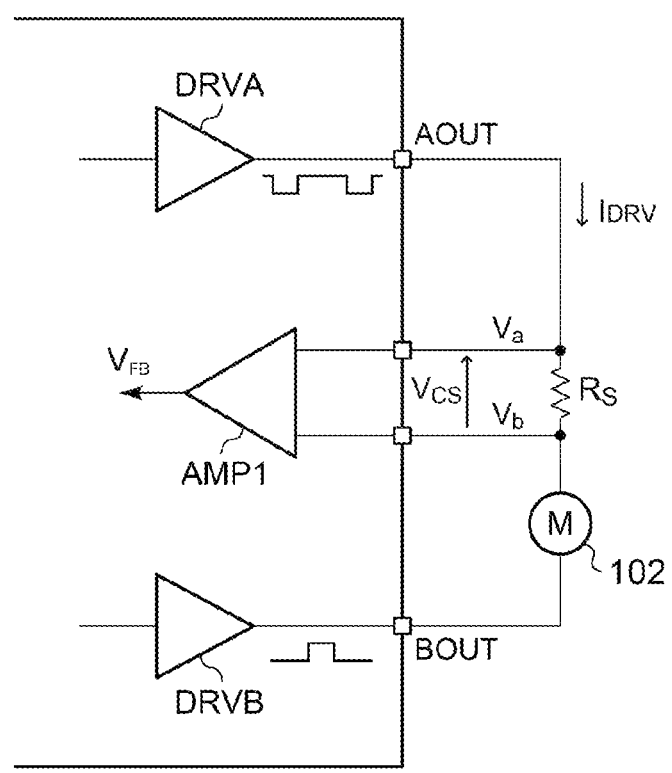
FIG. 1 is an explanatory diagram of current detection.

DETAILED DESCRIPTION OF THE PREFERRED EMBODIMENTS (Outline of Embodiments)

The outline of some illustrative embodiments of the present disclosure will be explained. The present outline is intended to explain, by way of introduction of the following detailed explanation, some concepts of one or more embodiments in a simple manner in order to develop a basic understanding of the embodiments, and thus, is not intended to limit the scope of the technology or the disclosure. The present outline is not a comprehensive outline of all conceivable embodiments, and is not intended to specify important components of all the embodiments or to define some or all of the embodiments. For convenience, "one embodiment" may be used to refer to one embodiment (embodiment or modification), or two or more embodiments (embodiments or modifications) disclosed herein.

A motor driver circuit according to one embodiment includes a first output terminal to be connected to a first end of a to-be-driven motor via a sense resistor, a second output terminal to be connected to a second end of the motor, an error detector that generates an error signal based on an error between a reference signal and a current feedback signal which is based on a voltage drop in the sense resistor, an A/D converter that obtains a digital signal by converting the error signal to the digital signal, a compensator that generates a voltage command value on the basis of the error signal obtained by the A/D converter, a D/A converter that converts the voltage command value to an analog control signal, a pulse width modulator that generates a first pulse by comparing the analog control signal with a first triangular wave and generates a second pulse by comparing the analog control signal with a second triangular wave of a phase opposite to that of the first triangular wave, and an output stage that generates, at the first output terminal, a first driving voltage corresponding to the first pulse, and generates, at the second output terminal, a second driving voltage corresponding to the second pulse. During a first mode, the compensator uses the error signal obtained by the A/D converter at a negative edge timing of the first pulse, for the error signal at a positive edge timing of the second pulse.

In a system in which PWM driving is performed and a current is detected by means of a sense resistor connected in series with a motor, the sense resistor introduces an asymmetry to the output stage. Specifically, AC-CMRR differs between when a transition of the first output occurs and when a transition of the second output occurs, whereby a current detection error is generated. As such, an error signal that is obtained upon a transition of the first pulse as a trigger is copied to be used as an error signal at a transition of the second pulse. Accordingly, the influence of the difference in the AC CMRR between the first output terminal and the second output terminal can be reduced, so that the accuracy of current detection can be improved. In addition, since a negative edge of the first pulse is generated prior to a transition of the first driving voltage, current detection can be performed while being free from the influence of the transition of the first driving voltage.

In one embodiment, during the first mode, the compensator may use the error signal obtained by the A/D converter at a positive edge timing of the first pulse, for the error signal at a negative edge timing of the second pulse.

In one embodiment, during a second mode, the compensator may use the error signal obtained by the A/D converter at a positive edge timing of the second pulse, for the error signal at a negative edge timing of the first pulse. In a case where the accuracy of current detection is deteriorated at a transition timing of the first pulse, switching to the second mode may be done to use the error signal obtained on the basis of the second pulse. Accordingly, the accuracy of current detection can be improved.

In one embodiment, during the second mode, the compensator may use the error signal obtained by the A/D converter at a negative edge timing of the second pulse, for the error signal at a positive edge timing of the first pulse.

In one embodiment, switching between the first mode and the second mode may be able to be done according to the voltage command value. When the voltage command value becomes great, a low section of the first pulse is shortened. In this case, current detection at a positive edge timing of the first pulse comes under the influence of the last transition of the first driving voltage immediately before the positive edge timing. This causes a possibility that the accuracy of current detection is deteriorated. For this reason, when the voltage command value is great, the second mode is adopted to achieve switching to current detection based on the second pulse. Accordingly, deterioration of the accuracy of current detection can be suppressed.

A motor driver circuit according to one embodiment includes a first output terminal to be connected to a first end of a to-be-driven motor via a sense resistor, a second output terminal to be connected to a second end of the motor, a current sense amplifier that generates a current feedback signal based on a voltage drop in the sense resistor, a feedback controller that generates a voltage command value so as to make the current feedback signal close to a reference signal, a pulse width modulator that generates a first pulse and a second pulse having complementary duty cycles according to the voltage command value in such a way that a center of a high section of the first pulse matches with a center of a high section of the second pulse, and an output stage that generates, at the first output terminal, a first driving voltage corresponding to the first pulse, and generates, at the second output terminal, a second driving voltage corresponding to the second pulse. The feedback controller includes an A/D converter that obtains a digital signal by converting an analog signal corresponding to the current feedback signal to the digital signal, and a digital circuit that generates the voltage command value by processing the digital signal. During a first mode, the digital circuit uses the digital signal obtained by the A/D converter at a negative edge timing of the first pulse, for the digital signal at a positive edge timing of the second pulse.

In one embodiment, during the first mode, the digital circuit may use the digital signal obtained by the A/D converter at a positive edge timing of the first pulse, for the digital signal at a negative edge timing of the second pulse.

In one embodiment, during a second mode, the digital circuit may use the digital signal obtained by the A/D converter at a positive edge timing of the second pulse, for the digital signal at a negative edge timing of the first pulse.

In one embodiment, during the second mode, the digital circuit may use the digital signal obtained by the A/D converter at a negative edge timing of the second pulse, for the digital signal at a positive edge timing of the first pulse.

In one embodiment, switching between the first mode and the second mode may be able to be done according to the voltage command value.

In one embodiment, the motor may be a linear motor. In one embodiment, the linear motor may be a voice coil motor.

In one embodiment, the motor driver circuit may be unitedly integrated on a single semiconductor substrate. The expression "unitedly integrated" encompasses a case in which all the constituent components of the circuit are formed on the semiconductor substrate and a case in which main constituent components of the circuit are integrated. In order to control a circuit constant, one or more resistors or capacitors among the components may be disposed outside the semiconductor substrate. As a result of forming an integrated circuit on a single chip, the circuit area can be reduced, and the characteristics of the circuit elements can uniformly be maintained.

A positioning device according to one embodiment includes a linear motor and any one of the above motor driver circuits that drives the linear motor.

A hard disk apparatus according to one embodiment includes the above positioning device.

(Embodiments)

Hereinafter, preferable embodiments will be explained with reference to the drawings. The identical or equivalent components, members, or processes in the drawings are denoted by the same reference numerals, and an overlapping explanation thereof will be omitted as appropriate. In addition, the disclosure and the technology are not limited to the embodiments, and the embodiments are illustrative of the disclosure and the technology. All the features described in the embodiments and any combination thereof are not necessarily essential to the present disclosure and the present technology.

In the present specification, the expression "a state where a member A is connected to a member B" encompasses a state where the member A is physically, directly connected to the member B and a state where the member A is indirectly connected to the member B via another member that has no substantial effect on the electrical connection of the member A and the member B or has no damage to functions and effects that are provided by the connection.

Similarly, the expression "a state where a member C is disposed between a member A and a member B" encompasses a state where the member A and the member C or the member B and the member C are directly connected to each other and a state where the member A and the member C or the member B and the member C are indirectly connected to each other via another member that has no substantial effect on the electrical connection or has no damage to functions and effects that are provided by the connection.

The vertical axis and the horizontal axis in each waveform chart and time chart given in the present specification are made large or small, as appropriate, for an easy understanding. The waveforms given herein are also simplified for an easy understanding.

Figure 2:
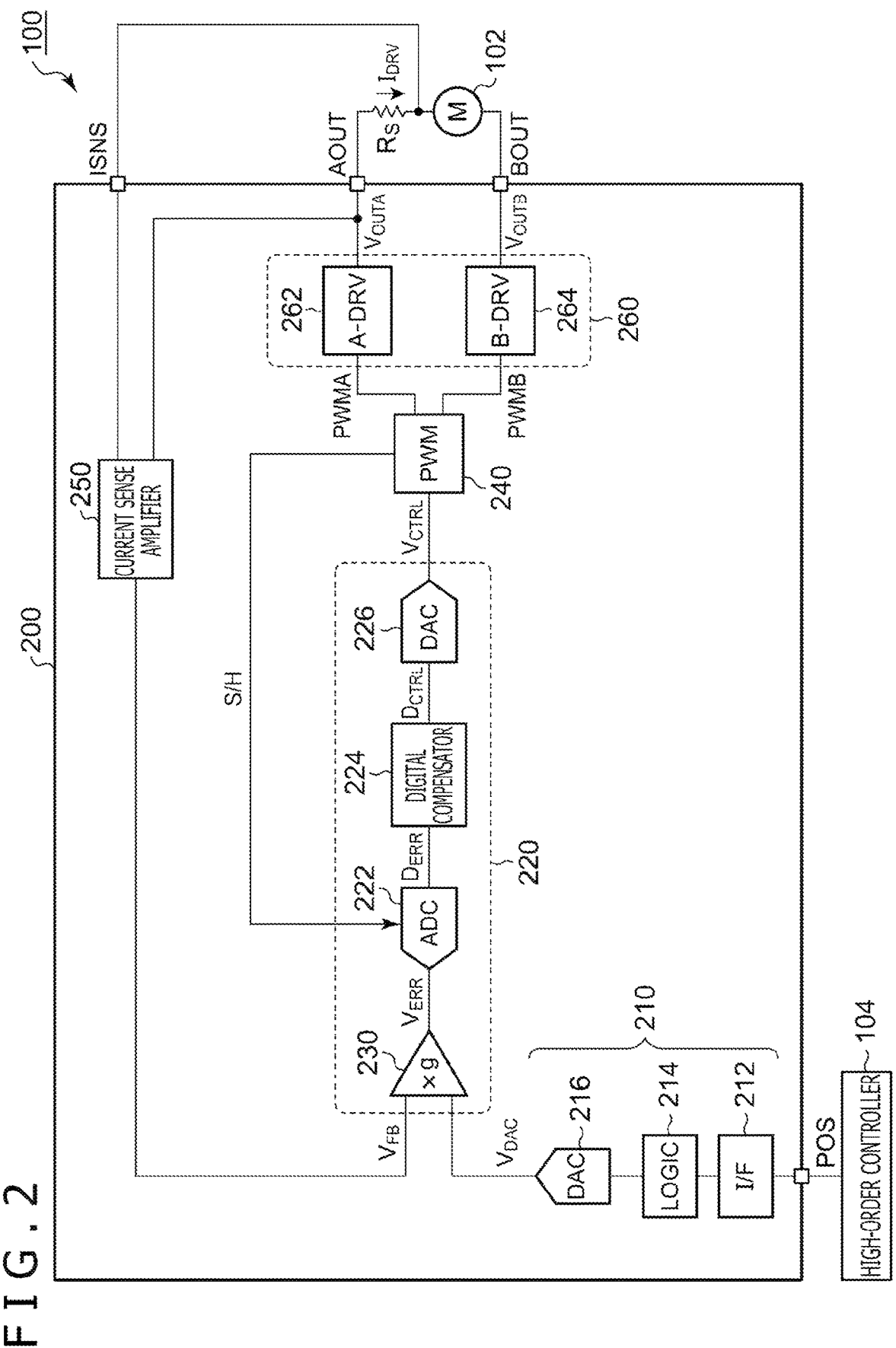
FIG. 2 is a block diagram of a positioning device including a motor driver circuit according to an embodiment.

FIG. 2 is a block diagram of a positioning device 100 including a motor driver circuit 200 according to an embodiment. The positioning device 100 includes a linear motor 102, a high-order controller 104, a motor driver circuit 200, and a sense resistor Rs.

The high-order controller 104 integrally controls the positioning device 100. The high-order controller 104 creates position control data POS which indicates a target position of the linear motor 102, and transmits the position control data POS to the motor driver circuit 200. The high-order controller 104 is configured by a micro-controller, a field programmable gate array (FPGA), or an application specific integrated circuit (ASIC), for example.

The motor driver circuit 200 receives the position control data POS, and supplies, to the linear motor 102, a driving current $I_{DRV}$ whose quantity corresponds to the position control data POS. The linear motor 102 is a voice coil motor, for example. The linear motor 102 has a movable element that is displaced by a quantity corresponding to the driving current $I_{DRV}$ flowing through the linear motor 102.

Next, a configuration of the motor driver circuit 200 will be explained. The motor driver circuit 200 includes a current command generation unit 210, a feedback controller 220, a pulse width modulator 240, a current sense amplifier 250, and an output stage 260. The motor driver circuit 200 is a functional integrated circuit (IC) integrated on a single semiconductor substrate.

The motor driver circuit 200 includes a first output terminal (A-phase output) AOUT, a second output terminal (B-phase output) BOUT, and a current detection terminal ISNS. To the AOUT terminal, one end of the linear motor 102 is connected via the sense resistor Rs. To the BOUT terminal, the other end of the linear motor 102 is connected. The ISNS terminal is connected to the one end of the linear motor 102.

The current command generation unit 210 generates an analog command signal $V_{DAC}$ which indicates a target value of a driving current $I_{DRV}$ to be supplied to the linear motor 102. For example, the current command generation unit 210 includes an interface circuit 212, a logic circuit 214, and a D/A converter 216. The interface circuit 212 is connected to the high-order controller 104, and receives various types of control data including the position control data POS. The interface circuit 212 may be an inter IC (I²C) interface or may be a serial peripheral interface (SPI), for example. Control data supplied from the interface circuit 212 includes a code indicating a target position of a movable element of the linear motor 102, for example. The logic circuit 214 outputs a control code based on the received code to the D/A converter 216. The control code may be the same as the code received from the high-order controller 104, or may be a different code obtained by computing the received code. The D/A converter 216 converts the control code generated by the logic circuit 214 to an analog command signal $V_{DAC}$.

It is to be noted that the configuration of the current command generation unit 210 is not limited to the above-mentioned one, and the current command generation unit 210 may be configured to receive the analog command signal $V_{DAC}$ directly from the outside.

The current sense amplifier 250 is connected to the AOUT terminal and the ISNS terminal, and generates a current feedback signal $V_{FB}$ which indicates a driving current $I_{DRV}$ flowing through the linear motor 102, on the basis of a voltage drop in the sense resistor Rs. Besides the AOUT terminal, one terminal KSNS for detecting a current may be added, and the current sense amplifier 250 may amplify the potential difference between the terminals ISNS and KSNS.

For example, the current feedback signal $V_{FB}$ is expressed by expression (1).

$$V_{FB}=k \times I_{DRV}+V_{CMREF} \quad (1)$$

where k and $V_{CMREF}$ each represent a given constant.

The feedback controller 220 generates a voltage command value $V_{CTRL}$ by feedback so as to make the current feedback signal $V_{FB}$ close to an analog command signal $V_{DAC}$ which is a reference signal.

The feedback controller 220 includes an error detection amplifier 230, an A/D converter 222, a digital compensator 224, and a D/A converter 226. The error detection amplifier 230 receives the current feedback signal $V_{FB}$ and the analog command signal $V_{DAC}$, and generates an analog error signal $V_{ERR}$ which indicates an error between the driving current $I_{DRV}$ and a target amount $I_{REF}$.

$$V_{ERR}=(I_{REF}-I_{DRV}) \times g$$

where g represents a finite gain.

The A/D converter 222 converts the analog error signal $V_{ERR}$ generated by the error detection amplifier 230 to a digital error signal $D_{ERR}$. The analog error signal $V_{ERR}$ is indicative of the driving current $I_{DRV}$, and is, specifically, indicative of an error between the driving current $I_{DRV}$ and a target amount thereof.

The digital compensator 224 generates a digital control amount $D_{CTRL}$ on the basis of the digital error signal $D_{ERR}$ outputted by the A/D converter 222. The digital compensator 224 includes a PI compensator or a PID compensator. The PI compensator multiplies the digital error signal $D_{ERR}$ with a proportional gain $K_P$, multiplies an integrated value of the digital error signal $D_{ERR}$ with an integration gain $K_I$, and sums up the multiplication results. Accordingly, the digital control amount $D_{CTRL}$ is generated.

The PID compensator multiplies the digital error signal $D_{ERR}$ with the proportional gain $K_P$, multiples an integrated value of the digital error signal $D_{ERR}$ with the integration gain $K_I$, multiplies a differential value of the digital error signal $D_{ERR}$ with a differentiation gain $K_D$, and sums up the multiplication results. Accordingly, the digital control amount $D_{CTRL}$ is generated. The PI compensator or the PID compensator may also be referred to a PI controller or a PID controller. Either the PI compensator or the PID compensator may be selected according to a characteristic of the control target.

The D/A converter 226 converts the digital control amount $D_{CTRL}$ to an analog control signal $V_{CTRL}$. The analog control signal $V_{CTRL}$ is also referred to as a voltage command value which is a command value of a voltage to be applied between both ends of the linear motor 102.

The pulse width modulator 240 generates a first pulse (A-phase PWM pulse) PWMA and a second pulse (B-phase PWM pulse) PWMB each having a duty cycle according to the voltage command value $V_{CTRL}$. The duty cycle of the PWMA signal has a positive correlation to the voltage command value $V_{CTRL}$. The duty cycle of the PWMB signal has a negative correlation to the voltage command value $V_{CTRL}$. The center of a high section of the PWMA signal matches, on the time axis, with the center of a high section of the PWMB signal. The center of a low section of the PWMA signal matches, on the time axis, with the center of a low section of the PWMB signal.

The configuration of the pulse width modulator 240 is not limited to a particular one. The pulse width modulator 240 may be formed by a publicly-known technology.

The pulse width modulator 240 can generate a first triangular wave TRIA and a second triangular wave TRIB of mutually opposite phases, generate a first pulse PWMA by comparing the first triangular wave TRIA with the voltage command value $V_{CTRL}$, and generate a second pulse PWMA by comparing the second triangular wave TRIB with the voltage command value $V_{CTRL}$.

The output stage 260 generates a first driving voltage $V_{OUTA}$ at the AOUT terminal according to the first pulse PWMA, and generates a second driving voltage $V_{OUTB}$ at the BOUT terminal according to the second pulse PWMB. The output stage 260 includes a first driver 262 and a second driver 264.

The first driver 262 generates, at the AOUT terminal, the first driving voltage $V_{OUTA}$ having a pulse form corresponding to the PWMA signal, and supplies the first driving voltage $V_{OUTA}$ to the one end of the linear motor 102 via the sense resistor Rs. The second driver 264 generates, at the BOUT terminal, the second driving voltage $V_{OUTB}$ having a pulse form corresponding to the PWMB signal, and supplies the second driving voltage $V_{OUTB}$ to the other end of the linear motor 102.

Specifically, the output stage 260 repeats four periods φ1 to φ4.

(i) First Period φ1

The A-phase driving voltage $V_{OUTA}$ is low, and the B-phase driving voltage $V_{OUTB}$ is low.

(ii) Second Period φ2

The A-phase driving voltage $V_{OUTA}$ is high, and the B-phase driving voltage $V_{OUTB}$ is low.

(iii) Third Period φ3

The A-phase driving voltage $V_{OUTA}$ is high, and the B-phase driving voltage $V_{OUTB}$ is high.

(iv) Fourth Period φ4

The A-phase driving voltage $V_{OUTA}$ is high, and the B-phase driving voltage $V_{OUTB}$ is low.

The length of the first period φ1 is equal to the length of the third period φ3. The length of the second period φ2 is equal to the length of the fourth period φ4.

By taking, as a trigger, a timing signal corresponding to an edge of the first pulse PWMA and the second pulse PWMB generated by the pulse width modulator 240, the A/D converter 222 obtains the digital error signal $D_{ERR}$ by converting the analog error signal $V_{ERR}$ to the digital error signal $D_{ERR}$. That is, the A/D converter 222 can obtain the digital error signal $D_{ERR}$ at positive edge and negative edge timings of the first pulse PWMA and at positive edge and negative edge timings of the second pulse PWMB.

In the motor driver circuit 200, switching between a first mode and a second mode can be done.

(First Mode)

In the first mode, the feedback controller 220 operates with reference to the first pulse PWMA.

During the first mode, the digital compensator 224 uses the error signal $D_{ERR}$ obtained by the A/D converter 222 at a negative edge timing of the first pulse PWMA, for the error signal at a positive edge timing of the second pulse PWMB.

Further, during the first mode, the digital compensator 224 uses the error signal $D_{ERR}$ obtained by the A/D converter 222 at a positive edge timing of the first pulse PWMA, for the error signal $D_{ERR}$ at a negative edge timing of the second pulse PWMB.

(Second Mode)

In the second mode, the feedback controller 220 operates with reference to the second pulse PWMB.

During the second mode, the digital compensator 224 uses the error signal $D_{ERR}$ obtained by the A/D converter 222 at a positive edge timing of the second pulse PWMB, for the error signal $D_{ERR}$ at a negative edge timing of the first pulse PWMA.

During the second mode, the digital compensator 224 uses the error signal $D_{ERR}$ obtained by the A/D converter 222 at a negative edge timing of the second pulse PWMB, for the error signal $D_{ERR}$ at a positive edge timing of the first pulse PWMA.

Figure 3:
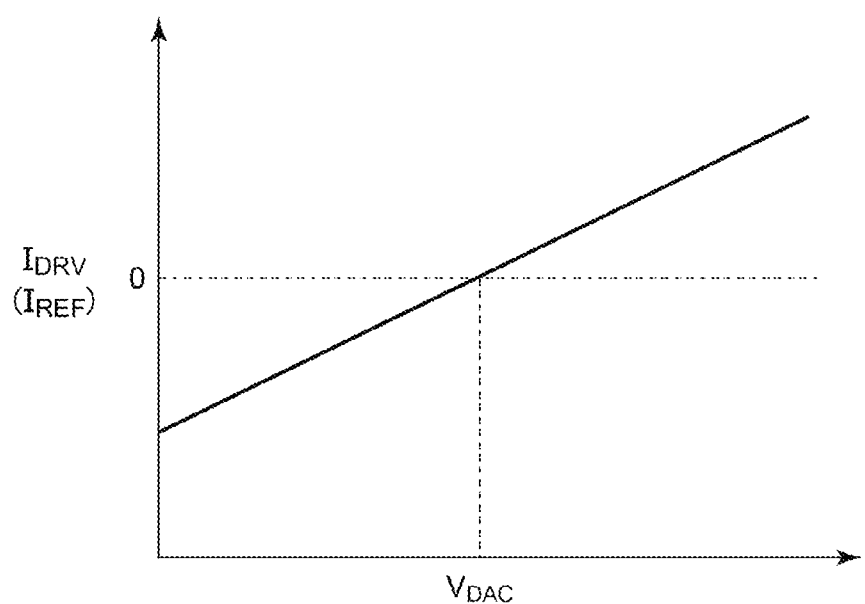
FIG. 3 is a diagram illustrating input/output characteristics of the motor driver circuit in FIG. 2.

The configuration of the positioning device 100 has been explained so far. Next, operation thereof will be explained. FIG. 3 is a diagram illustrating input/output characteristics of the motor driver circuit 200 in FIG. 2. Through feedback control performed by the digital compensator 224, feedback is performed so as to make an error between the current feedback signal $V_{FB}$ and the analog command signal $V_{DAC}$ small. Therefore, in a state where the feedback is stable, expression (2) is established.

$$V_{FB} = k \times I_{DRV} + V_{CMREF} = V_{DAC} \qquad (2)$$

During a stationary state in which expression (2) is established, the driving current $I_{DRV}$ is stabilized at a target level $I_{REF}$=which is expressed by expression (3).

$$I_{REF} = (V_{DAC} - V_{CMREF})/k \qquad (3)$$

Operation of the motor driver circuit 200 has been explained so far. Compared to an analog type circuit, the motor driver circuit 200 can easily be designed because an analog phase compensation circuit is not required.

Figure 4:
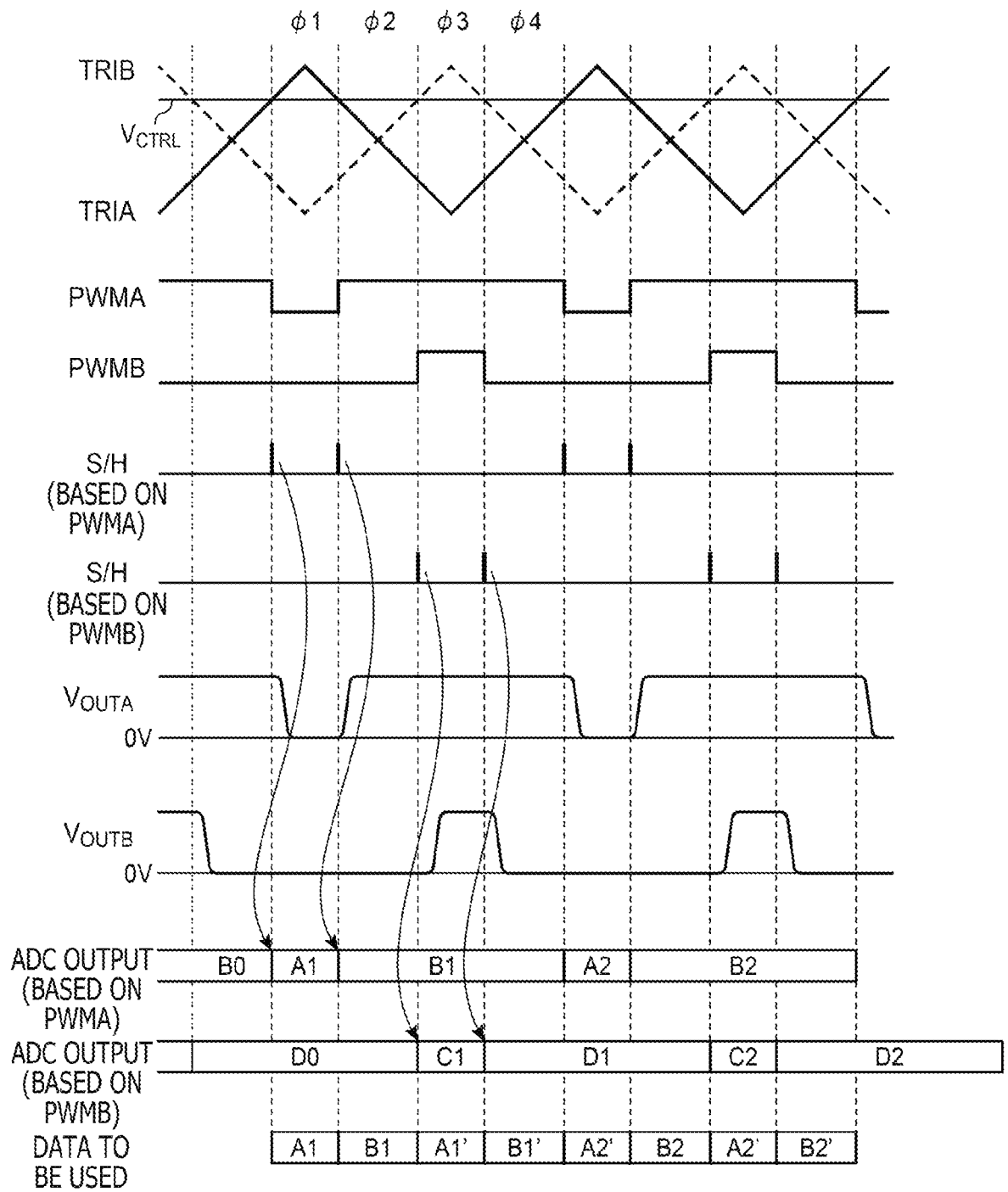
FIG. 4 is an operation waveform chart of a first mode of the motor driver circuit.

FIG. 4 is an operation waveform chart of the first mode of the motor driver circuit 200. The first pulse PWMA is high when $V_{CTRL}$>TRIA, and is low when $V_{CTRL}$<TRIA. The second pulse PWMB is high when $V_{CTRL}$>TRIB, and is low when $V_{CTRL}$<TRIB.

Ax represents an error signal $D_{ERR}$ that is data outputted by the A/D converter 222 and that is obtained at a negative edge timing of the first pulse PWMA. Bx represents an error signal $D_{ERR}$ that is data outputted by the A/D converter 222 and that is obtained at a positive edge timing of the first pulse PWMA.

Cx represents an error signal $D_{ERR}$ that is data outputted by the A/D converter 222 and that is obtained at a positive edge timing of the second pulse PWMB. Dx represents an error signal $D_{ERR}$ that is data outputted by the A/D converter 222 and that is obtained at a negative edge timing of the second pulse PWMB. x represents the cycle of PWM.

The lowest row in FIG. 4 indicates data to be referred to by the digital compensator 224. During the first mode, the error signal Ax obtained at a negative edge timing of the first pulse PWMA is used for an error signal Ax' at a positive edge timing of the second pulse PWMB.

During the first mode, the error signal Bx obtained at a positive edge timing of the first pulse PWMA is used for an error signal Bx' at a negative edge timing of the second pulse PWMB.

The first mode operation has been described so far.

In a system in which PWM driving is performed and a current is detected by means of a sense resistor Rs connected in series with a motor, an asymmetry is introduced to an output stage by the sense resistor Rs. Specifically, AC-CMRR differs between when a transition of the A-phase output occurs and when a transition of the B-phase output occurs, whereby a current detection error is generated. As such, error signals Ax and Bx obtained upon a transition of the first pulse PWMA as a trigger are copied, and are used for error signals Ax' and Bx' at a transition of the second pulse PWMB. Accordingly, the influence of the difference in the AC CMRR between the A-phase output and the B-phase output can be reduced, and the accuracy of current detection can be improved.

The first driver 262 generates a first driving voltage $V_{OUTA}$ according to the first pulse PWMA. Accordingly, the first driving voltage $V_{OUTA}$ is delayed from the first pulse PWMA. In other words, the first pulse PWMA precedes the first driving voltage $V_{OUTA}$. Therefore, since a sampling timing based on a negative edge of the first pulse PWMA comes prior to a transition from a high state to a low state of the first driving voltage $V_{OUTA}$, the data Ax does not come under the influence of the transition of the first driving voltage $V_{OUTA}$. As a result, the accuracy of current detection is high. Similarly, since a sampling timing based on a positive edge of the first pulse PWMA comes prior to a transition from a low state to a high state of the first driving voltage $V_{OUTA}$, the data Bx does not come under the influence of the transition of the first driving voltage $V_{OUTA}$. As a result, the accuracy of current detection is high.

Next, the second mode will be explained.

Figure 5:
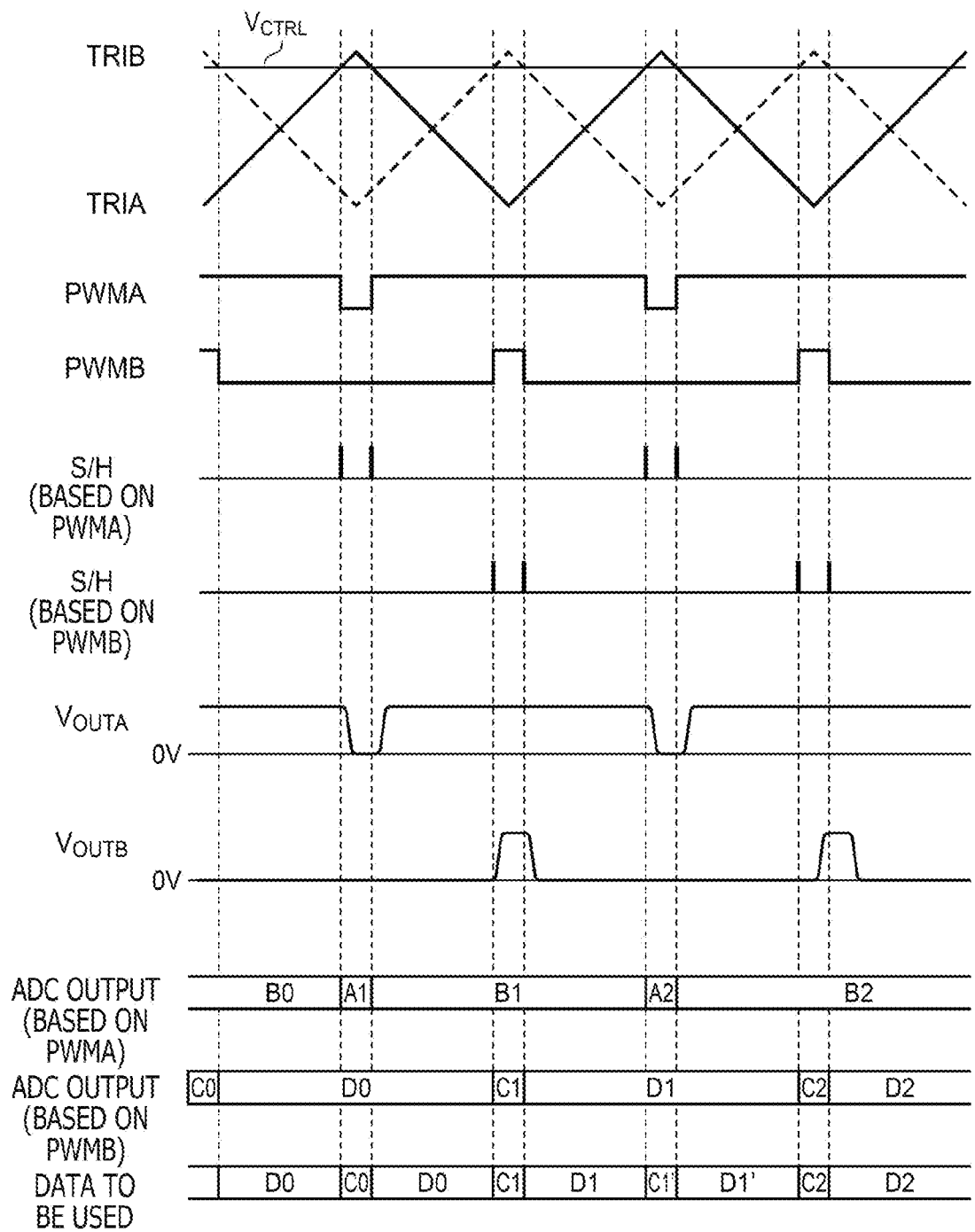
FIG. 5 is an operation waveform chart of a second mode of the motor driver circuit.

FIG. 5 is an operation waveform chart of the second mode of the motor driver circuit 200. During the second mode, the error signal Cx obtained at a positive edge timing of the second pulse PWMB is used for an error signal Cx' at a negative edge timing of the first pulse PWMA.

During the second mode, the error signal Dx obtained at a negative edge timing of the second pulse PWMB is used for an error signal Dx' at a positive edge timing of the first pulse PWMA.

Operation during the second mode has been explained so far. As illustrated in FIG. 5, when a low section of the first pulse PWMA is short, a positive edge timing of the first pulse PWMA is close to a fall edge of the first driving voltage $V_{OUTA}$ that precedes the positive edge timing. In this case, if the first mode is set, a current detection result B1 at a positive edge timing of the first pulse PWMA comes under the influence of a transition to a negative edge of the first driving voltage $V_{OUTA}$, whereby the accuracy of current detection is deteriorated. In such a case, the second mode can be selected to suppress deterioration of the accuracy of current detection. Specifically, since a positive edge timing of the second pulse PWMB is sufficiently far from a transition to a positive edge of the first driving voltage $V_{OUTA}$ that precedes the positive edge timing, the accuracy of a current detection result C1 is considered to be high.

A negative edge timing of the second pulse PWMB is close, in terms of time, to a transition to a positive edge of the second driving voltage $V_{OUTB}$ immediately before the negative edge timing. Here, the influence of a transition of the second driving voltage $V_{OUTB}$ on the accuracy of current detection is smaller than the influence of a transition of the first driving voltage $V_{OUTA}$. Therefore, the accuracy of a current detection result D1 at a negative edge timing of the second pulse PWMB is also considered to be high.

For example, the second mode is selected when the voltage command value $D_{CTRL}$ is greater than a predetermined threshold, and the first mode is selected when the voltage command value $D_{CTRL}$ is less than the predetermined threshold. Accordingly, a current can be precisely detected at all times.

Next, a configuration example of the current sense amplifier 250 and the error detection amplifier 230 will be explained.

Figure 6:
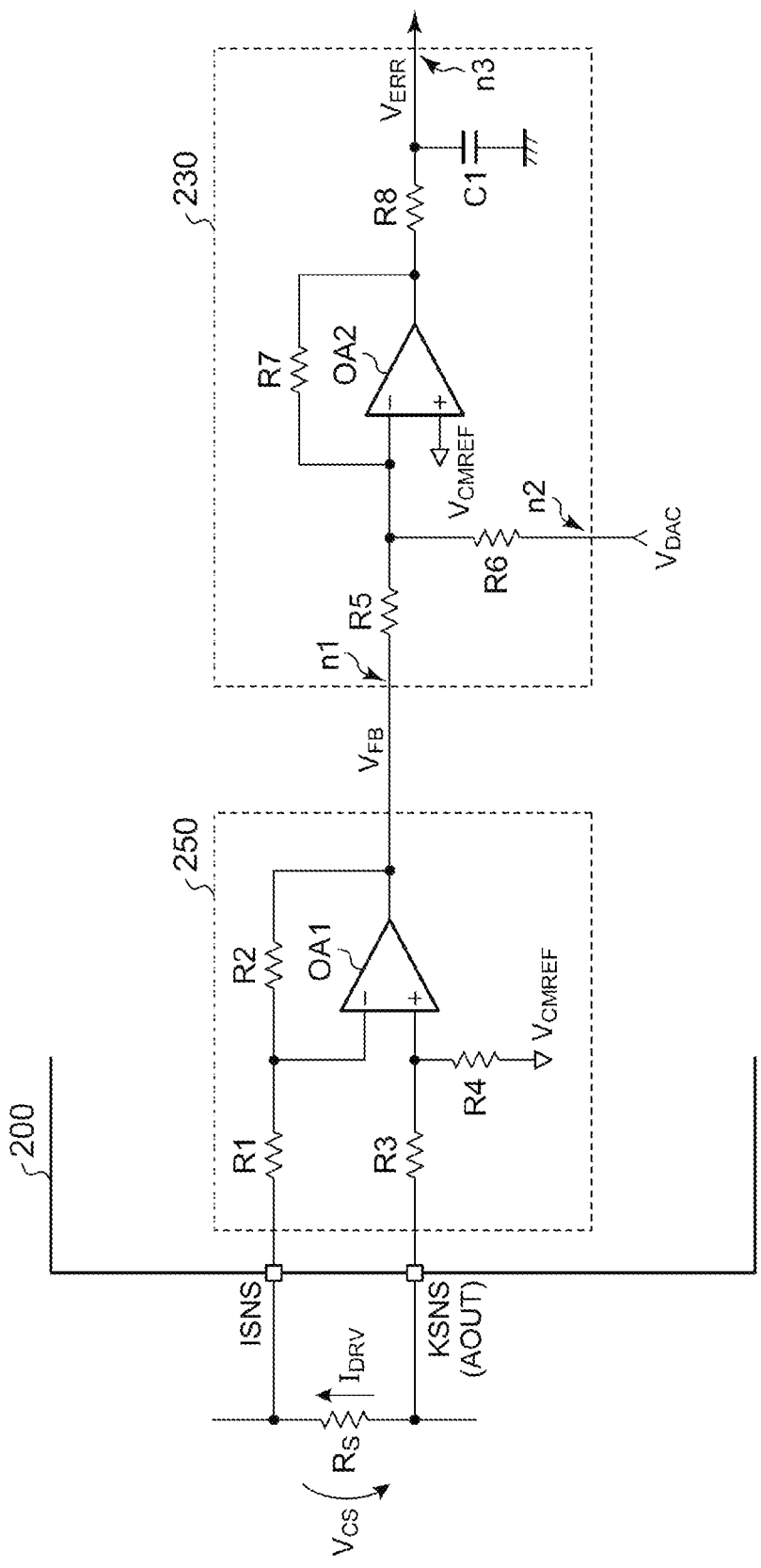
FIG. 6 is a circuit diagram illustrating a configuration example of a current sense amplifier and an error detection amplifier.

FIG. 6 is a circuit diagram illustrating a configuration example of the current sense amplifier 250 and the error detection amplifier 230.

In the sense resistor Rs, a voltage drop that is proportional to the driving current $I_{DRV}$ occurs. A voltage drop $V_{CS}$ in the sense resistor Rs is fed back between the current sense pins ISNS and KSNS (AOUT) of the motor driver circuit 200.

$V_{CS} = R_S \times I_{DRV}$

The current sense amplifier 250 generates the current feedback signal $V_{FB}$ that linearly changes with respect to the voltage $V_{CS}$ and that reaches a predetermined level $V_{CMREF}$ when $V_{CS}=0$ (that is, $I_{DRV}=0$).

The current sense amplifier 250 includes a first operational amplifier OA1, a first resistor R1, a second resistor R2, a third resistor R3, and a fourth resistor R4.

The first resistor R1 is connected between an inversion input (−) of the first operational amplifier OA1 and one end (ISNS pin) of the sense resistor Rs. The second resistor R2 is connected between an inversion input (−) of the first operational amplifier OA1 and an output of the first operational amplifier OA1. The third resistor R3 is connected between a non-inversion input (+) of the first operational amplifier OA1 and the other end (KSNS pin) of the sense resistor Rs. The fourth resistor R4 has one end that receives a voltage $V_{CMREF}$ of a predetermined level, and has the other end that is connected to the non-inversion input (+) of the first operational amplifier OA1. The current feedback signal $V_{FB}$ corresponds to the output voltage of the first operational amplifier OA'.

When R1=R3 and R2=R4, the following expression is established.

$V_{FB} = R2/R1 \times V_{CS} + V_{CMREF}$

The error detection amplifier 230 includes a first input node n1, a second input node n2, an output node n3, a second operational amplifier OA2, a fifth resistor R5, a sixth resistor R6, a seventh resistor R7, an eighth resistor R8, and a capacitor C1. The current feedback signal $V_{FB}$ is inputted to the first input node n1. The analog command signal $V_{DAC}$ is inputted to the second input node n2.

The second operational amplifier OA2, the fifth resistor R5, the sixth resistor R6, and the seventh resistor R7 constitute a summing amplifier. The non-inversion input (+) of the second operational amplifier OA2 receives the reference voltage $V_{CMREF}$. The fifth resistor R5 is connected between an inversion input (−) of the second operational amplifier OA2 and the first input node n1. The sixth resistor R6 is connected between the inversion input (−) of the second operational amplifier OA2 and the second input node n2. A voltage command signal $V_{EAOUT}$ may correspond to the voltage of the output of the second operational amplifier OA2. The seventh resistor R7 is connected between the inversion input (−) and the output of the second operational amplifier OA2.

The gain g of the summing circuit with respect to the feedback voltage $V_{FB}$ is R7/R5.

Further, the eighth resistor R8 is connected between the output of the second operational amplifier OA2 and the output node n3 of the error detection amplifier 230. The capacitor C1 is connected to the output node n3. The eighth resistor R8 and the capacitor C1 constitute a low pass filter. The low pass filter functions as an anti-aliasing filter of the A/D converter 222 on the post-stage of the low pass filter.

The configuration example of the current sense amplifier 250 and the error detection amplifier 230 has been explained so far.

Figure 7:
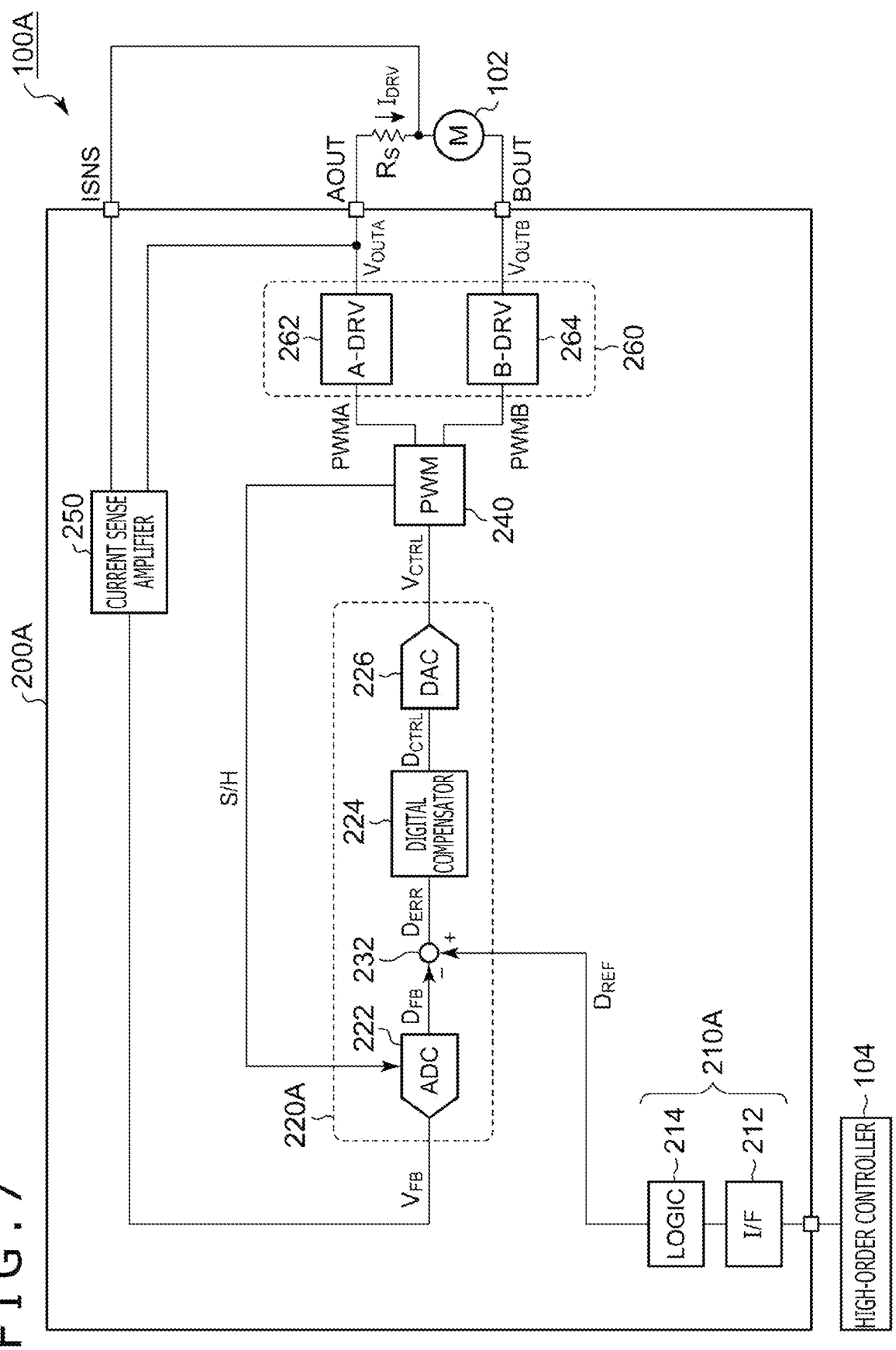
FIG. 7 is a circuit diagram of a motor driver circuit according to another embodiment.

FIG. 7 is a circuit diagram of a motor driver circuit 200A according to another embodiment. A current command generation unit 210A outputs a target code (digital command value) $D_{REF}$ which indicates a target position of a movable element to a feedback controller 220A. The A/D converter 222 of the feedback controller 220A converts the current feedback signal $V_{FB}$ to a digital feedback value $D_{FB}$. The error detector 232, which is a subtractor, generates an error $D_{ERR}$ between the digital feedback value $D_{FB}$ and the target code $D_{REF}$. The remaining points are identical to those in FIG. 2.

With the motor driver circuit 200A in FIG. 7, effects similar to those provided by the motor driver circuit 200 in FIG. 2 can be obtained.

It is to be noted that the motor driver circuit 200 in FIG. 2 has an advantage over the motor driver circuit 200A in FIG. 7. This advantage will be explained below.

Attention is focused on the current feedback signal $V_{FB}$ which is an input to the A/D converter 222 in the motor driver circuit 200A in FIG. 7. During a stationary state in which a feedback loop is stabilized, the error $D_{ERR}$ is zero, and thus, $D_{REF}=D_{FB}$ is established. That is, when the digital command value $D_{REF}$ changes, the current feedback signal $V_{FB}$ which is an input to the A/D converter 222 changes in such a way that a digital current feedback signal $D_{FB}$ that matches with the digital command value $D_{REF}$ is generated. That is, in the motor driver circuit 200A in FIG. 7, according to a change of the digital command value $D_{REF}$, the current feedback signal $V_{FB}$ fluctuates within a wide range. Consequently, it is necessary to select a high-bit A/D converter as the A/D converter 222.

An advantage of the motor driver circuit 200 in FIG. 2 over the motor driver circuit 200A in FIG. 7 will be explained. Attention is focused on an input to the A/D converter 222 in the motor driver circuit 200 in FIG. 2. The analog error signal $V_{ERR}$ is inputted to the A/D converter 222. During a stationary state in which the feedback loop is stabilized, the analog error signal $V_{ERR}$ is substantially zero, irrespective of a target level $I_{REF}$ of the driving current $I_{DRV}$ or the magnitude of the analog command signal $V_{DAC}$. Accordingly, the fluctuation range of an input voltage to the A/D converter 222 is narrower than that in FIG. 7. Therefore, an A/D converter with a lower bit number than that of the A/D converter 222 in FIG. 7 can be adopted as the A/D converter 222 in FIG. 2. Since the bit number of the A/D converter 222 is reduced, the chip cost and power consumption in the motor driver circuit 200 can be reduced.

Moreover, in the motor driver circuit 200, the gain of the error detection amplifier 230 can be increased because the error signal $V_{ERR}$, that is, an input to the A/D converter 222 has a voltage level of zero during a stationary state, irrespective of the gain. An effect provided by an increase of the gain of the error detection amplifier 230 is the same as that provided by increase of the bit number (resolution) of the A/D converter 222. Therefore, also for this reason, the bit number of the A/D converter 222 can be reduced in the motor driver circuit 200.

For example, if a 16-bit A/D converter 222 is required in the motor driver circuit 200A in FIG. 7, the bit number of the A/D converter 222 of the motor driver circuit 200 in FIG. 2 may be reduced to 12 bits. As such a low-bit A/D converter 222, a successive approximation register (SAR) digital-to-analog converter (DAC) may be used. Alternatively, any other form may be used.

Figure 8:
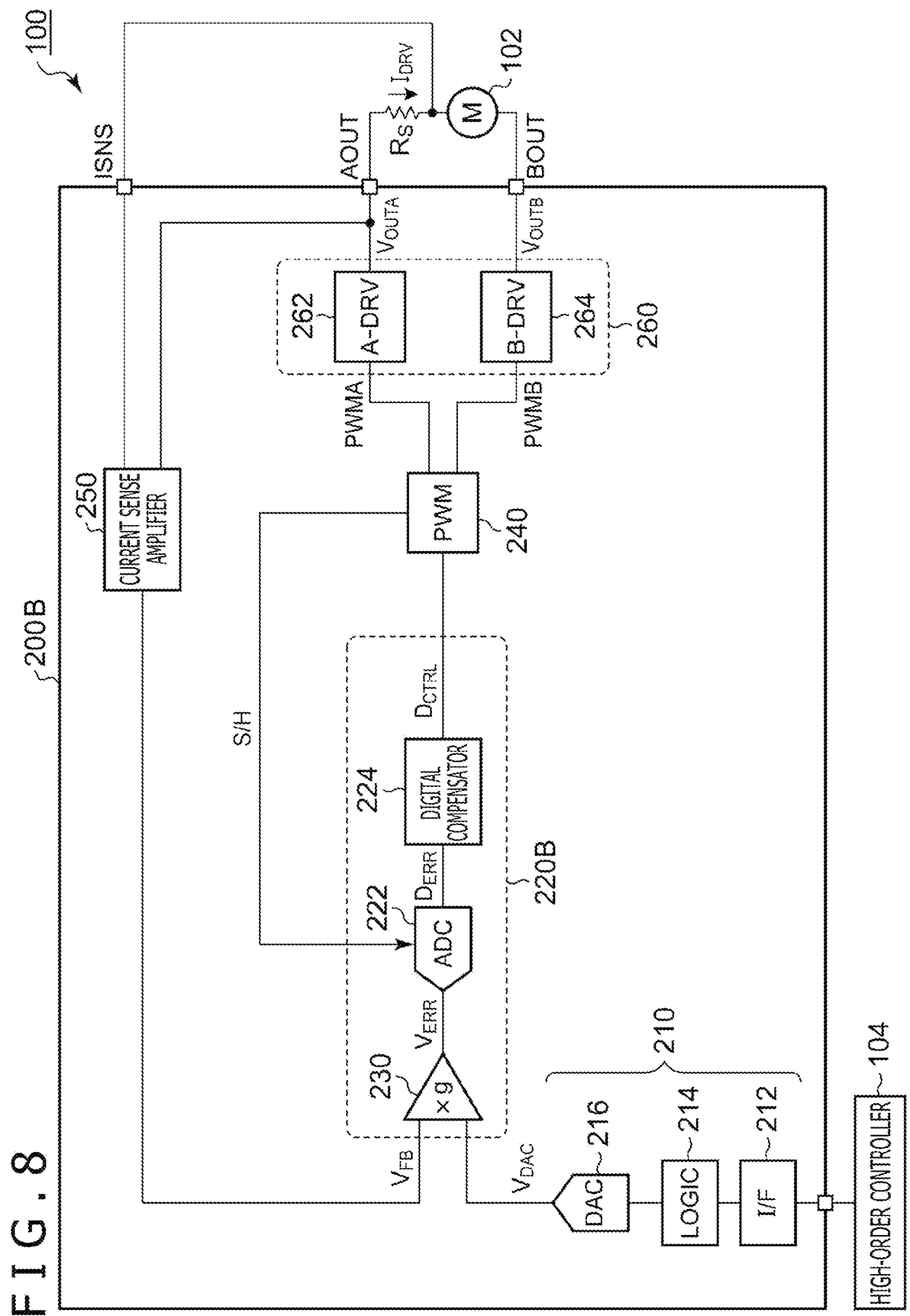
FIG. 8 is a circuit diagram of a motor driver circuit according to still another embodiment.

FIG. 8 is a circuit diagram of a motor driver circuit 200B according to still another embodiment. In the motor driver circuit 200B, a pulse width modulator 240B is configured by a digital circuit, and the D/A converter 226 is omitted from a feedback controller 220B.

With the motor driver circuit 200B in FIG. 8, an effect similar to that provided by the motor driver circuit 200 in FIG. 2 can be obtained.

(Applications)

Figure 9:
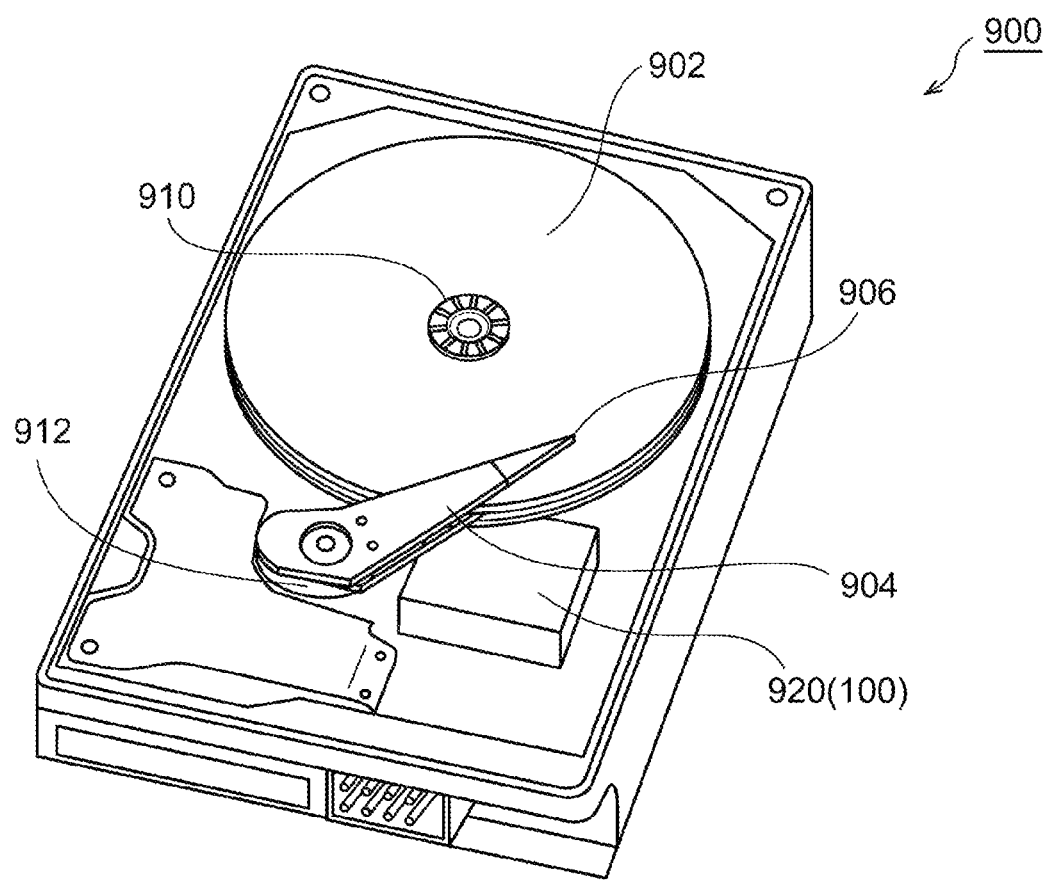
FIG. 9 is a diagram illustrating a hard disk apparatus including a motor driver circuit.

FIG. 9 is a diagram illustrating a hard disk apparatus 900 which includes the motor driver circuit 200. The hard disk apparatus 900 includes a platter 902, a swing arm 904, a head 906, a spindle motor 910, a seek motor 912, and a motor driver circuit 920. The motor driver circuit 920 drives the spindle motor 910 and the seek motor 912.

The seek motor 912 is a voice coil motor. The motor driver circuit 200 (or 200A) according to the embodiment is included in the motor driver circuit 920, and drives the seek motor 912. The seek motor 912 positions the head 906 via the swing arm 904.

In the present disclosure, the configuration or form of the linear motor to be driven is not limited to a particular one. The present disclosure can be applied for driving a spring return type voice coil motor or any other linear actuator, for example. Alternatively, the motor to be driven may be a spindle motor.

Application of the positioning device 100 is not limited to a hard disk apparatus. The positioning device 100 is applicable to a camera lens positioning mechanism, for example.

What is claimed is:

1. A motor driver circuit comprising:
a first output terminal to be connected to a first end of a to-be-driven motor via a sense resistor;
a second output terminal to be connected to a second end of the motor;
an error detector that generates an error signal based on an error between a reference signal and a current feedback signal which is based on a voltage drop in the sense resistor;
an analog-to-digital converter that obtains a digital signal by converting the error signal to the digital signal;
a compensator that generates a voltage command value on a basis of the error signal obtained by the analog-to-digital converter;
a digital-to-analog converter that converts the voltage command value to an analog control signal;
a pulse width modulator that generates a first pulse by comparing the analog control signal with a first triangular wave and generates a second pulse by comparing the analog control signal with a second triangular wave of a phase opposite to that of the first triangular wave; and
an output stage that generates, at the first output terminal, a first driving voltage corresponding to the first pulse, and generates, at the second output terminal, a second driving voltage corresponding to the second pulse, wherein,
during a first mode, the compensator uses the error signal obtained by the analog-to-digital converter at a negative edge timing of the first pulse, for the error signal at a positive edge timing of the second pulse.

2. The motor driver circuit according to claim 1, wherein, during the first mode, the compensator uses the error signal obtained by the analog-to-digital converter at a positive edge timing of the first pulse, for the error signal at a negative edge timing of the second pulse.

3. The motor driver circuit according to claim 1, wherein, during a second mode, the compensator uses the error signal obtained by the analog-to-digital converter at a positive edge timing of the second pulse, for the error signal at a negative edge timing of the first pulse.

4. The motor driver circuit according to claim 3, wherein, during the second mode, the compensator uses the error signal obtained by the analog-to-digital converter at a negative edge timing of the second pulse, for the error signal at a positive edge timing of the first pulse.

5. The motor driver circuit according to claim 3, wherein switching between the first mode and the second mode is able to be done according to the voltage command value.

6. The motor driver circuit according to claim 1, wherein the motor is a linear motor.

7. The motor driver circuit according to claim 6, wherein the linear motor is a voice coil motor.

8. The motor driver circuit according to claim 1, wherein the motor driver circuit is unitedly integrated on a single semiconductor substrate.

9. A positioning device comprising:
a linear motor; and
the motor driver circuit according to claim 1, the motor driver circuit driving the linear motor.

10. A hard disk apparatus comprising:
the positioning device according to claim 9.

11. A motor driver circuit comprising:
a first output terminal to be connected to a first end of a to-be-driven motor via a sense resistor;
a second output terminal to be connected to a second end of the motor;
a current sense amplifier that generates a current feedback signal based on a voltage drop in the sense resistor;
a feedback controller that generates a voltage command value so as to make the current feedback signal close to a reference signal;
a pulse width modulator that generates a first pulse and a second pulse having complementary duty cycles according to the voltage command value in such a way that a center of a high section of the first pulse matches with a center of a high section of the second pulse; and
an output stage that generates, at the first output terminal, a first driving voltage corresponding to the first pulse, and generates, at the second output terminal, a second driving voltage corresponding to the second pulse, wherein
the feedback controller includes
an analog-to-digital converter that obtains a digital signal by converting an analog signal corresponding to the current feedback signal to the digital signal, and
a digital circuit that generates the voltage command value by processing the digital signal, and,
during a first mode, the digital circuit uses the digital signal obtained by the analog-to-digital converter at a negative edge timing of the first pulse, for the digital signal at a positive edge timing of the second pulse.

12. The motor driver circuit according to claim 11, wherein,
during the first mode, the digital circuit uses the digital signal obtained by the analog-to-digital converter at a positive edge timing of the first pulse, for the digital signal at a negative edge timing of the second pulse.

13. The motor driver circuit according to claim 11, wherein,
during a second mode, the digital circuit uses the digital signal obtained by the analog-to-digital converter at a positive edge timing of the second pulse, for the digital signal at a negative edge timing of the first pulse.

14. The motor driver circuit according to claim 13, wherein,
during the second mode, the digital circuit uses the digital signal obtained by the analog-to-digital converter at a negative edge timing of the second pulse, for the digital signal at a positive edge timing of the first pulse.

15. The motor driver circuit according to claim 13, wherein
switching between the first mode and the second mode is able to be done according to the voltage command value.

16. The motor driver circuit according to claim 11, wherein
the motor is a linear motor.

17. The motor driver circuit according to claim 16, wherein
the linear motor is a voice coil motor.

18. The motor driver circuit according to claim 11, wherein
the motor driver circuit is unitedly integrated on a single semiconductor substrate.

19. A method for driving a motor, the method comprising:
connecting a sense resistor in series with a first end of the motor;
generating a current feedback signal on a basis of a voltage drop in the sense resistor;
generating an error signal based on an error between the current feedback signal and a reference signal;
obtaining, by an analog-to-digital converter, a digital signal by converting the error signal to the digital signal;
generating a voltage command value corresponding to the digital signal;
converting the voltage command value to an analog control signal;
generating a first pulse by comparing the analog control signal with a first triangular wave, and generating a second pulse by comparing the analog control signal with a second triangular wave of a phase opposite to that of the first triangular wave; and
applying a first driving voltage corresponding to the first pulse and a second driving voltage corresponding to the second pulse to the motor, wherein,
during a first mode, in the generating the voltage command value, the digital signal obtained by the analog-to-digital converter at a negative edge timing of the first pulse is used for the digital signal at a positive edge timing of the second pulse.

* * * * *